(12) United States Patent
Haider

(10) Patent No.: US 7,117,090 B2
(45) Date of Patent: Oct. 3, 2006

(54) MOVING VEHICLE IN CUBOIDAL PANORAMA

(75) Inventor: Sultan Haider, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 10/930,003

(22) Filed: Aug. 30, 2004

(65) Prior Publication Data

US 2005/0049788 A1    Mar. 3, 2005

(30) Foreign Application Priority Data

Aug. 28, 2003   (EP) ................... 03019472

(51) Int. Cl.
*G06F 19/00* (2006.01)

(52) U.S. Cl. ...................... 701/301; 348/148

(58) Field of Classification Search .............. 701/1, 701/29, 301; 700/245, 255; 348/129, 130, 348/148, 161

See application file for complete search history.

(56) References Cited

U.S. PATENT DOCUMENTS

| | | | | |
|---|---|---|---|---|
| 5,262,852 | A * | 11/1993 | Eouzan et al. ................. | 348/39 |
| 6,535,114 | B1 * | 3/2003 | Suzuki et al. ................. | 340/435 |
| 6,535,242 | B1 * | 3/2003 | Strumolo et al. ............. | 348/148 |
| 6,704,621 | B1 * | 3/2004 | Stein et al. .................... | 701/1 |
| 6,765,480 | B1 * | 7/2004 | Tseng ....................... | 340/425.5 |
| 6,911,997 | B1 * | 6/2005 | Okamoto et al. ........... | 348/148 |
| 2005/0029458 | A1 * | 2/2005 | Geng et al. .................. | 250/347 |
| 2005/0030378 | A1 * | 2/2005 | Stiller ........................ | 348/148 |

OTHER PUBLICATIONS

A. Hauck, M. Sorg, T. Schenk, and G. Färber. "What can be Learned from Human Reach-To-Grasp Movements for the Design of Robotic Hand-Eye Systems?". In Proc. *IEEE Int. Conf. on Robotics and Automation (ICRA'99)*, pp. 2521-2526, May 1999.

Oliver Bringmann, Wolfgang Rosenstiel, Annette Muth, George Färber, Frank Slomka, and Richard Hofmann., (Oct. 1999) "Visual Determination of 3D Grasping Points on Unknown Objects with a Binocular Camera System", In *Proc. IEEE/RSJ Int. Conf. on Intelligent Robots and Systems (IROS'99)*.

Yoseph-Bar-Cohen,(Jan. 2002), "Biologically Inspired Robots as Artificial Inspectors", *NDT.net-*, vol. 7 No. 01.

Weiss Y.,and Adelson E. H. (1995) "Motion Estimation and Segmentation with a Recurrent Mixture-of-Experts Architecture", In F. Girosi, et al. (eds.), *Neural Nets for Signal Processing V* (pp. 293-303).

A. Hauck, J. Rüttinger, M. Sorg, and G. Färber. (Oct. 1999)"Visual Determination of 3D Grasping Points on Unknown Objects with a Binocular Camera System" In *Proc. IEEE/RSJ Int. Conf. on Intelligent Robots and Systems (IROS'99)*.

John J. Craig,(1989) "Introduction to Robotics-Mechanics and Control", *Second edition. Addison-Wesley Publishing Company*. pp. 18-61; 227-261.

(Continued)

*Primary Examiner*—Gary Chin
(74) *Attorney, Agent, or Firm*—Schiff Hardin LLP

(57) ABSTRACT

A method for monitoring movement of a moving object and avoiding a collision with it comprises constructing a panoramic image from images of a rotating camera attached to the moving object, constructing a virtual cuboid around the moving object utilizing data from the panoramic image, calculating a difference between a position of the cuboid and a position of an obstacle, and changing a moving direction of the moving object if the difference between the position of the cuboid and the position of an obstacle is smaller than a threshold value to avoid the obstacle.

15 Claims, 12 Drawing Sheets

OTHER PUBLICATIONS

A. Hauck, M. Sorg, T. Schenk, and G. Färber. (1998), "A Biologically Motivated Model for the Control of Visually Guided Reach-To-Grasp Movements". In *Proc. Int. Conf. on Intelligent Systems*, pp. 295-300.

Thomas Fink, Alexa Hauck, and Georg Färber. (Apr. 1998), "Towards an Anthropomorphic Robotical Hand-Eye Coordination". In *IMACS Conf. on Comp. Eng. in Systems Appl. (CESA'98)*, vol. 4, pp. 483-488.

A. Hauck and G. Färber (1996) Hybrid Hand-Eye Coordination with a Single Stationary Camera. In *4th Int. Conf. on Control, Automation,Robotics and Computer Vision (ICARCV'96)*, pp. 1715-1719.

P. Leven, S. Hutchinson, D. Burschka, and G. Farber . (May 1999)"Perception-based motion planning for indoor exploration". In *Proc. IEEE Int. Conf. on Robotics and Automation (ICRA'99)*, pp. 695-701.

Wang, J. Y. A., and Adelson, (Feb. 1994)E. H. "Spatio-Temoral Segmentation of Video ata", Proceedings of SPIE on Image and Video Processing II, 82: 120-131,San Jose.

* cited by examiner

2-D DEPTH MAP D(X,Y)
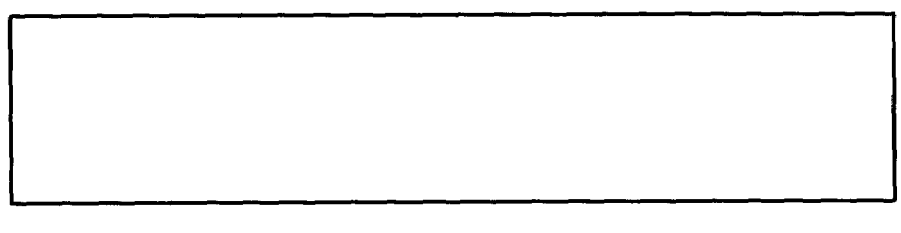
1-D MINIMUM DISTANCE MAP M(X)
FIG. 4

MOVING VEHICLE IN CUBOIDAL PANORAMA

BACKGROUND OF THE INVENTION

The invention provides a cost-effective solution for avoiding a collision between a vehicle and obstacles while moving in a natural environment without using range sensors or multiple cameras. The state of the art utilizes range sensors and multiple cameras for the detection of the obstacles.

SUMMARY OF THE INVENTION

Although many technological advances in the automotive industry revolve around convenience and pleasure for consumers, safety and reliability remain as the utmost concerns. The present invention provides a cost-effective solution for avoiding a collision without using range sensors.

The invention provides a method for monitoring movement of a moving object and avoiding a collision with it comprises constructing a panoramic image from images of a rotating camera attached to the moving object, constructing a virtual cuboid around the moving object utilizing data from the panoramic image, calculating a difference between a position of the cuboid and a position of an obstacle, and changing a moving direction of the moving object if the difference between the position of the cuboid and the position of an obstacle is smaller than a threshold value to avoid the obstacle.

DESCRIPTION OF THE DRAWINGS

The invention is explained in more detail below respect to various embodiments of the invention with reference to the following figures.

FIG. 4 is a graph illustrating the mapping of a 2-D depth map onto a 1-D minimum distance map;

DETAILED DESCRIPTION OF THE PREFERRED EMBODIMENTS

Figure 1:
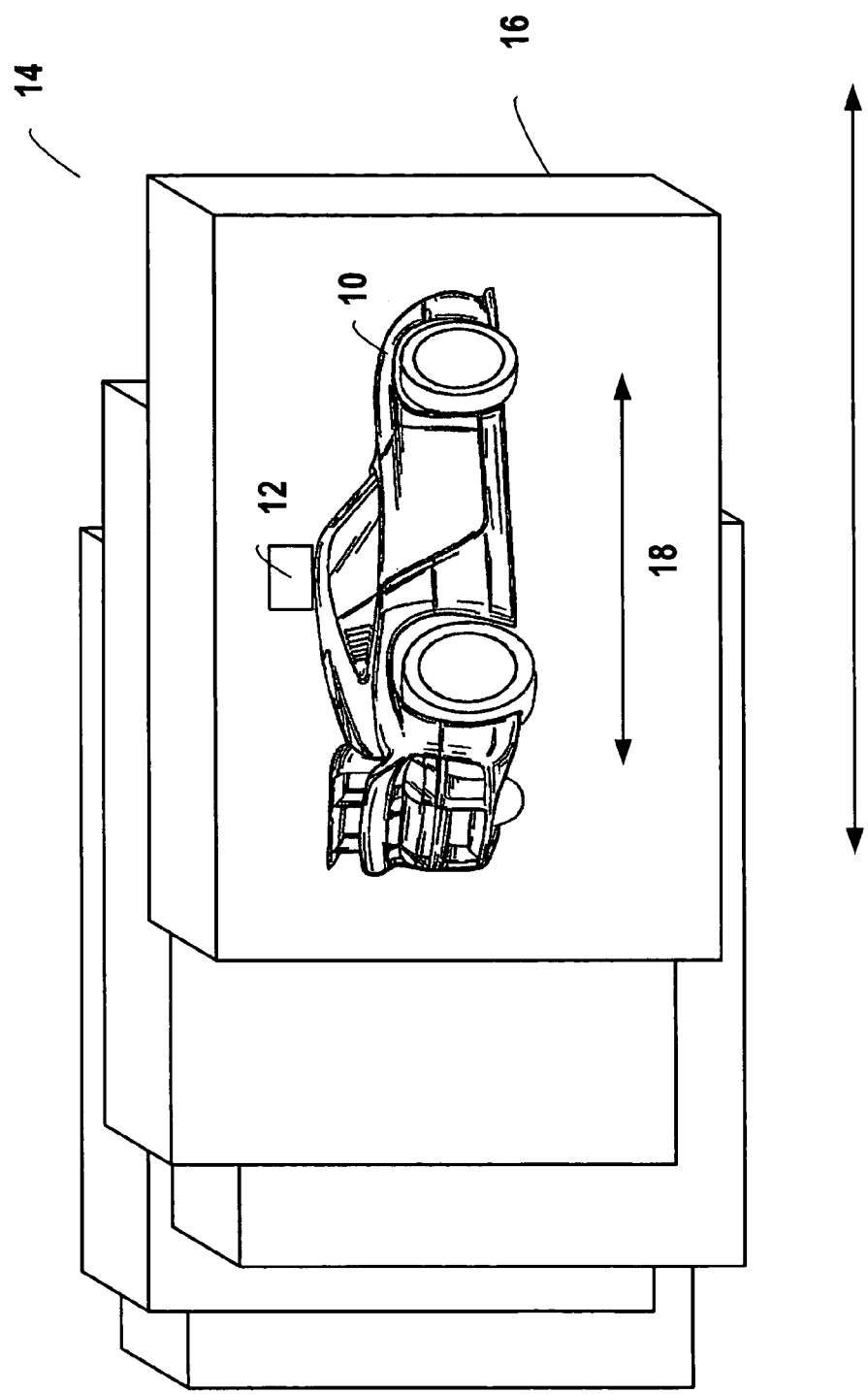
FIG. 1 is a pictorial illustration of a vehicle moving within a virtual cuboidal structure.

FIG. 1 illustrates an overview of an embodiment of the invention. Multiple views are obtained from a rotating two-dimensional/three-dimensional camera 12 installed on the top of the vehicle 10 for perceiving depth within a moving environment (relative displacement) for the vehicle 10. A virtual cuboidal structure 14 is generated having eight vertices at its corners, six total faces, and four vertical faces 16, one or more of the four vertical faces 16 containing depth information.

Figure 2:
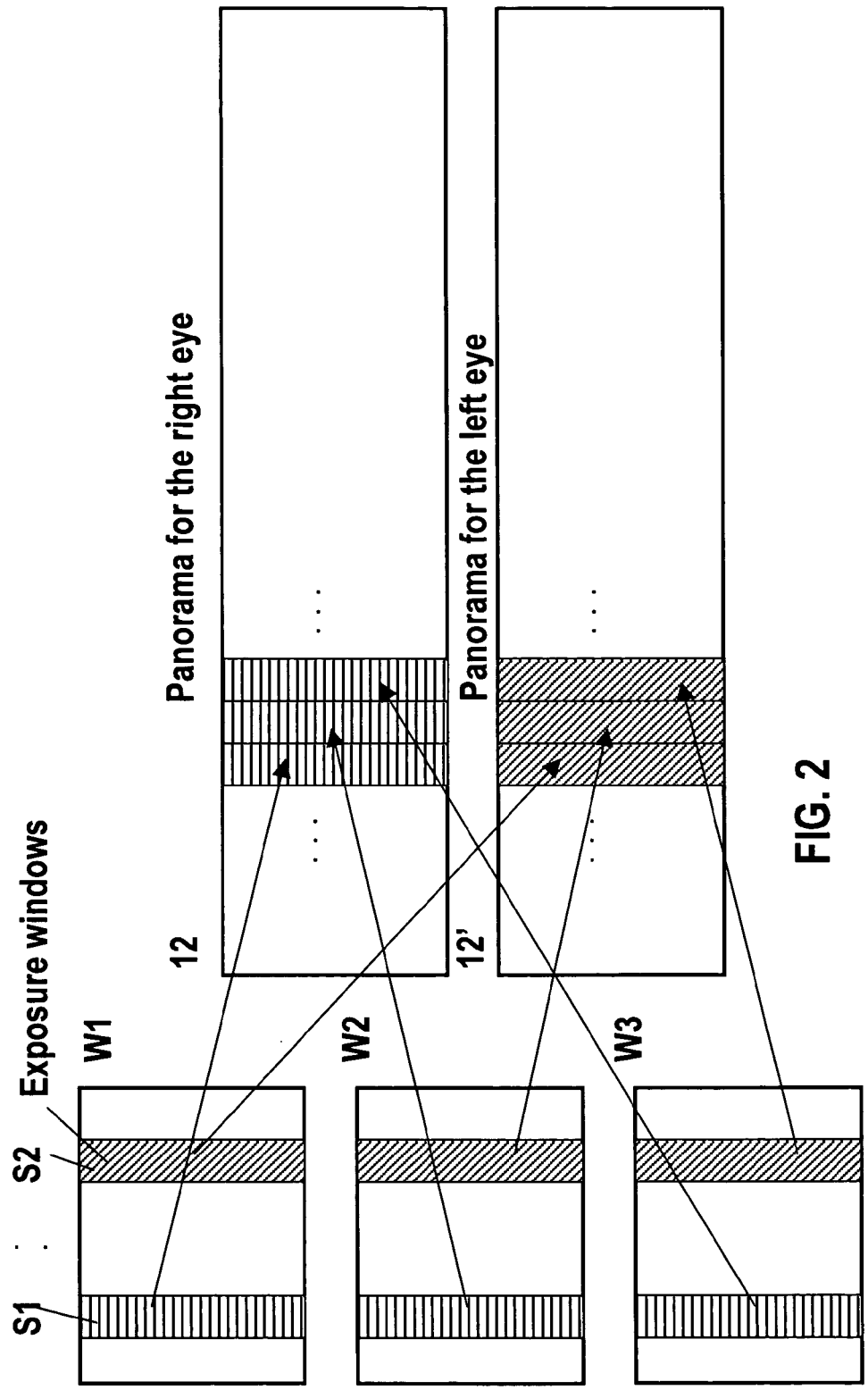
FIG. 2 is a pictorial block diagram illustrating the generation of stereoscopic panoramas by a single camera.

FIG. 2 illustrates how a stereoscopic panorama containing depth information can be achieved by a single camera 12, 12'. The camera in a first position 12 images three exposure windows W1–W3 utilizing slits S1 and S2; the images obtained from slit S1 are combined to create a panorama image for the right eye. Instead of utilizing a single stereo camera, the camera is moved to a second position 12' where it images the same three exposure windows W1–W3; the images obtained from slit S2 are combined to produce a panorama image for the left eye.

Figure 3:
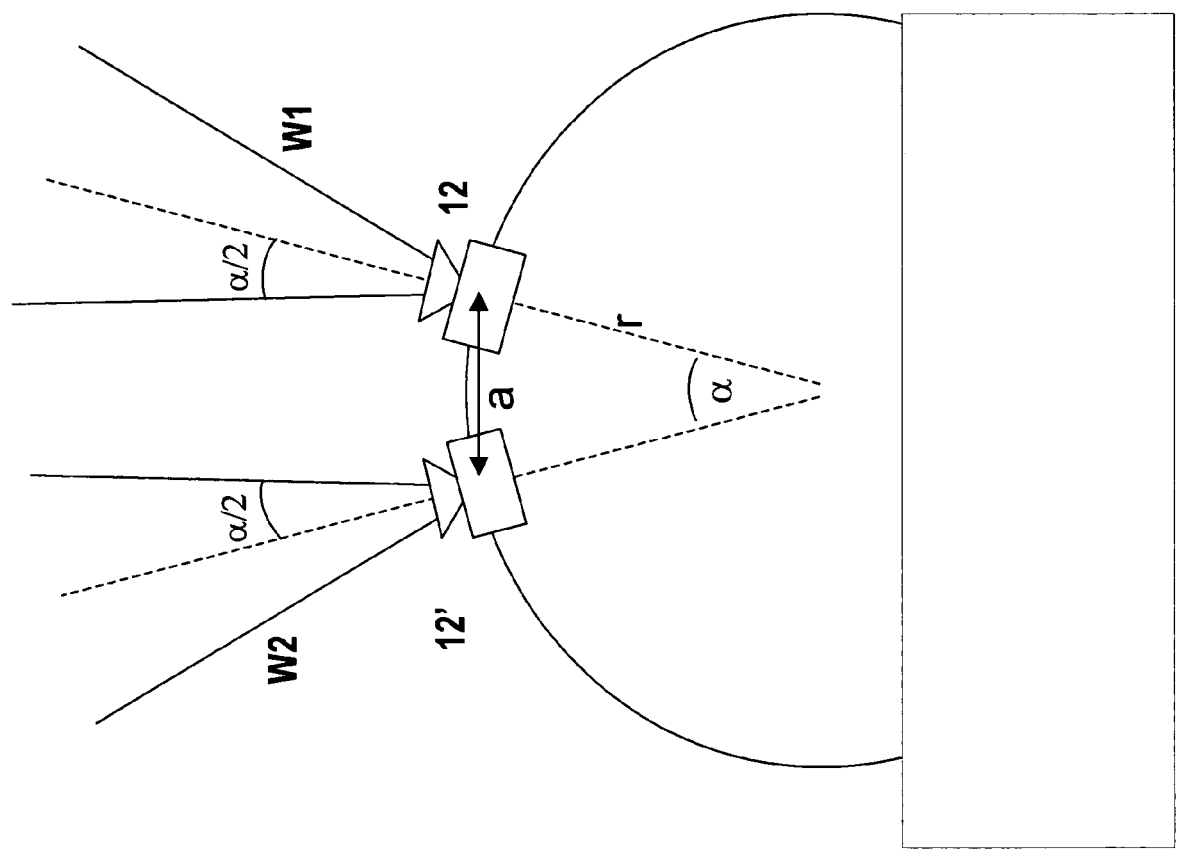
FIG. 3 is a pictorial diagram illustrating the generation of stereoscopic panoramas by a single camera moving in an angular direction.

FIG. 3 illustrates this concept by a camera 12, 12' moving in an angular direction. As the camera moves on a circular arc with radius r from a first position 12 to a second position 12' separated by a distance a for an angle α, two frames are recorded, the view from each position subtending an angle α (α/2 from the centerline of the view). Given a distance r of the camera 12, 12' from the center of rotation, and for small angles, the rotation angle can be calculated α=arctan (a/r).

Using these principles, a two-dimensional depth map D(x,y) is prepared based on the depth information obtained from the rotating camera 12. This map D(x,y) contains several distances for each particular direction imaged, since an obstacle could be in any direction. To find the minimum distance map M(x) to an object being imaged, the minimum distance M(x) at each vertical line of the depth map is calculated as follows: $M(x):=\min_y (D(x,y))$ (see FIG. 4).

Figure 5:
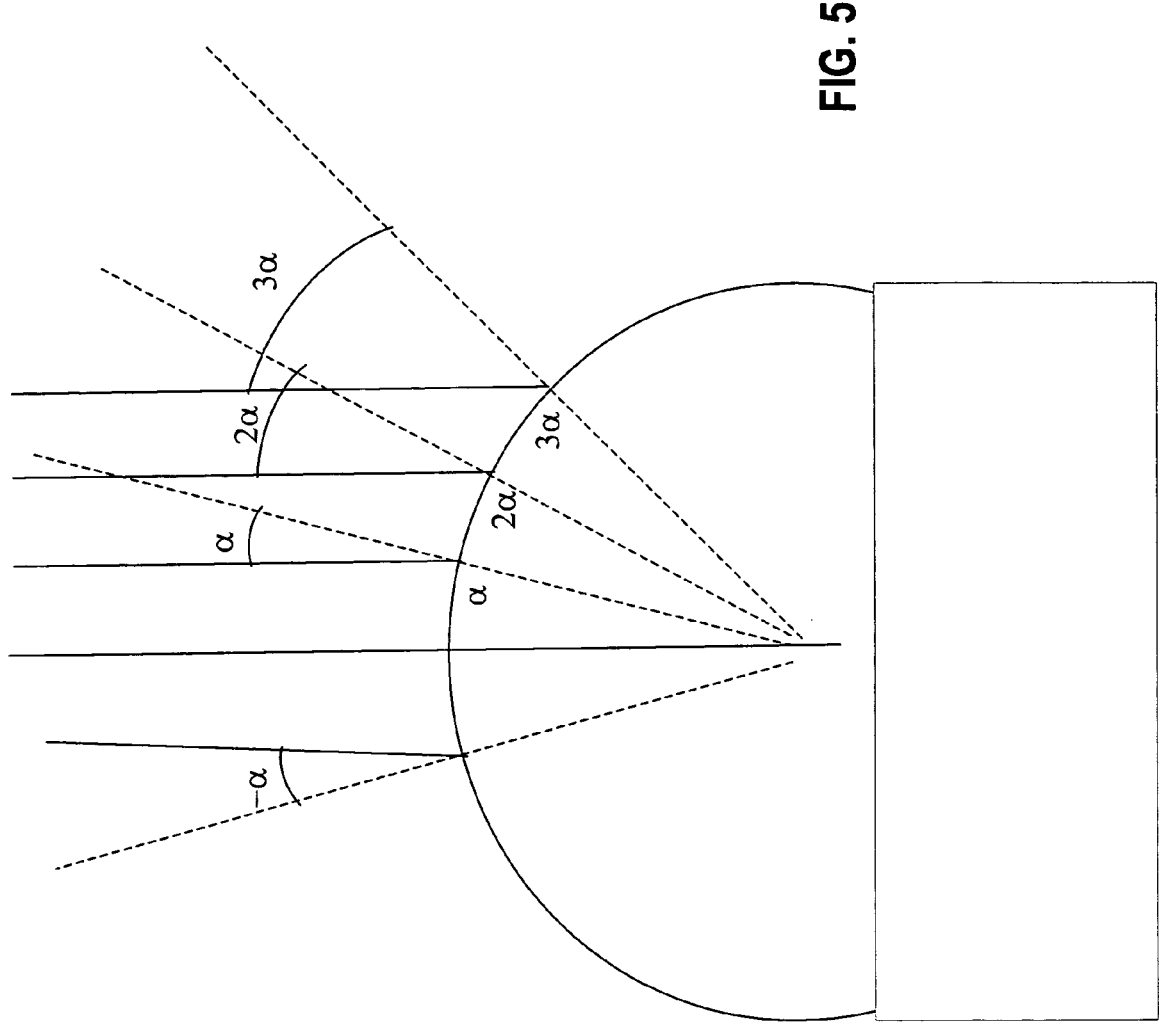
FIG. 5 is a pictorial diagram illustrating the use of an extension of views.

FIG. 5 provides an illustration of how this concept may be extended for multiple views. Multiple views are needed for auto-stereoscopic systems (e.g., lens rasters) or for a free view choice on non-stereoscopic systems.

For each view n, its own panorama picture is designed. A desired angle between views can be determined as follows, where:

f=focal length of the camera;
g=object size;
d=pixel density (pixels/cm);
n=number of views; and
p=position of the photographed windows.

A photograph window of n views results for a pixel-position as follows:

$\tan(n\alpha)=g/f$; and $p=g*d.$

Thus for position of the photographed window for pixel-position for n views:

$p=d*f*\tan(n\alpha)$

Figure 6:
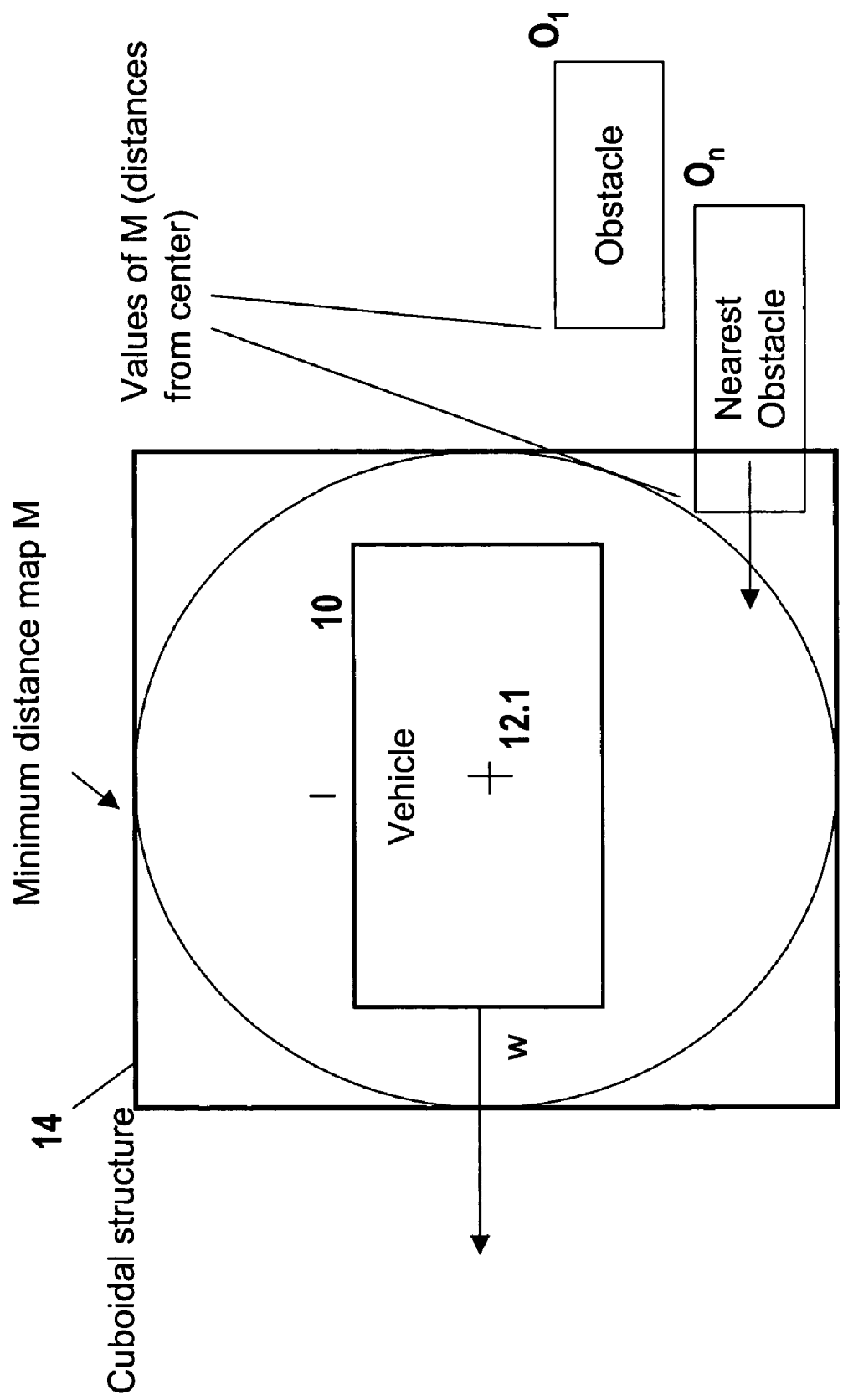
FIG. 6 is a pictorial diagram illustrating the generation of a minimum distance map with a fitted rectangle.
Figure 7:
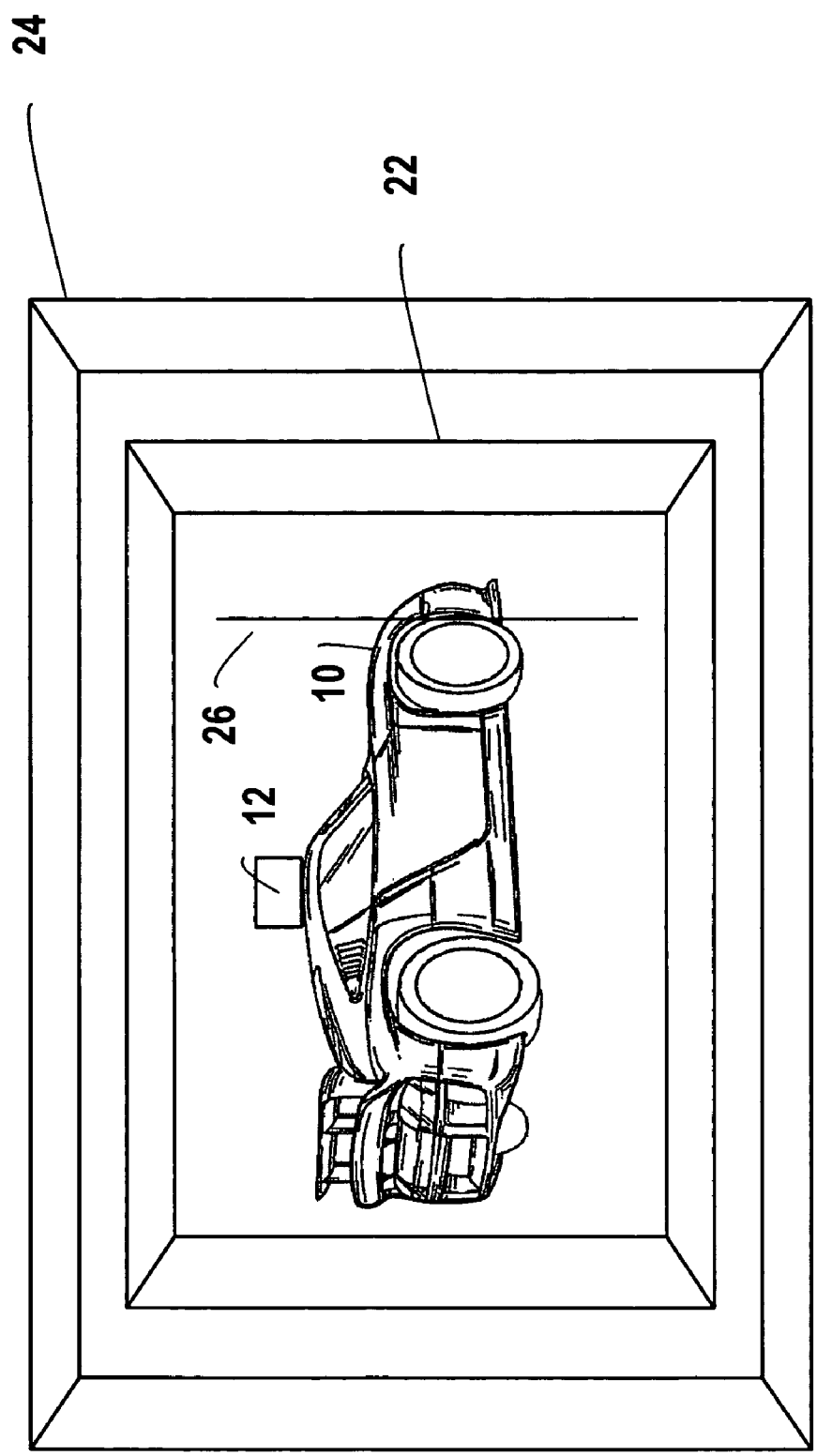
FIG. 7 is a pictorial illustration of frame generation within the cuboidal structure showing a threshold.

FIG. 6 illustrates the generation of the minimum distance map M with a fitted rectangle. The minimum distance map M is represented as a circle defining the distances from the center camera position 12.1 to each direction (FIG. 7). The vehicle 10 is fitted into the circle and a cuboidal structure 14 is made by making use of the nearest obstacle distance. The fitting can be done by known matching techniques, especially least squares techniques.

The virtual cuboid 14 is generated by making use of minimum distance depth map M and by 3-D coordinates of the eight vertices of the vehicle as illustrated in FIG. 6. Initially a cuboid 14 is created with the minimum distance map M and is changed in the respective direction where the same or other obstacle distance from the camera center is shortened. Any obstacle O coming into the virtual cuboid 14 is, by definition, to be avoided by the vehicle 10.

The rotational velocity $\omega_c$ of the camera 12 depends upon a relative velocity $\vec{v}_{vo}$ between the obstacles $O_{1-N}$ and the vehicle 10. If the vehicle 10 is moving, the angular velocity $\omega_c$ of the camera 12 also depends on the translation $\vec{v}_v$/rotational $\omega_v$ velocity of the vehicle 10. The three-dimensional virtual cuboid 14 moves and changes with the relative position $\vec{d}_{vo}$ of the vehicle 10 and obstacles O. In case there are several obstacles $O_{1-N}$, the mean positional value of the obstacles is calculated. The cuboid 14 is used to direct a control mechanism of the vehicle 10 to steer it about any object that may be a static/moving obstacle O relative to the vehicle 10. A look up table could be used to adjust various parameters, as can kinematic motion equations to calculate the approach velocity of the obstacle.

If an obstacle O is static relative to the vehicle 10, the velocity of the obstacle $\vec{v}_o$ is measured with respect to an absolute origin independent of the vehicle motion or object motion. The new reference coordinate system will follow the velocity vector $\vec{v}_v$ (18) of the vehicle 10 (using a manipulation of the camera space, described below).

In the case when the cuboidal walls 16 change position, which means that there has been a relative motion $\vec{d}_{vo}$ between the obstacles O and the vehicle 10, the camera sensory mechanism 12 informs a vehicle control mechanism (e.g., a steering mechanism and/or accelerator, brake) so that it can determine a probability of collision, which is then interpreted by a user for controlling the vehicle 10. An exact determination could only be made if the system works perfectly—this cannot be so, since there could be a sudden change in the movement of the obstacle O which could reduce or increase the risk of collision. An approach vector for a safer path is adjusted by using a camera space manipulation to avoid colliding with the obstacles.

This technique not only makes use of the algorithmic nature of monocular vision but also makes use of the qualitative nature of biological vision, e.g., by making use of depth maps for avoiding the collision, and providing an estimation of the collision risk. Advantages include:
  there is no need for auxiliary range sensors; only a single monocular camera is used for the generation of a cuboidal structure;
  a compact and simple design is possible; and
  applications are possible in the area of: 1) tools for medical intervention, e.g., controlling the path of a catheter or a pill controlled by magnetic fields for minimum invasive surgery; 2) robotics and automation, e.g., guiding robotic arms to a particular position or avoiding objects; 3) insertion of synthetic objects into the natural environment using depth maps and panorama images; and 4) 2-D and 3-D games.

Although the term "vehicle" is used in the description below, this term is to be understood as any moving object, including objects associated with the applications identified in the preceding paragraph.

In more detail, a monocular camera 12 is mounted on top of the vehicle 10 with a rotational mechanism so as to generate a 360° view (in this case, the radius of the image plane center to the camera rotational center is greater than zero in order to extract the depth information).

Initially, the cuboids 14 are generated, where the sides of the cuboids are constructed by the 360° rotation of the monocular camera 12, which obtains depth information within the scene.

The rotational velocity $\omega_c$ of the camera 12 depends upon the velocity $\vec{v}_v$ of the vehicle 10 and relative velocity $\vec{v}_{vo}$ of the obstacle O. The size of the cube 14 depends upon the relative velocity $\vec{v}_{vo_{1-N}}$ of the vehicle 10 and obstacles $O_{1-N}$ in every direction. The relative velocity $\vec{v}_{vo_{1-N}}$ also affects the rotational velocity $\omega_c$ of the camera 12 for bringing accurate control to the system.

FIG. 7 illustrates how various layers, e.g., layer one 22 and layer two 24 are generated within the cuboid 14. These layers 22, 24 are made corresponding to a depth defined as distance from a particular vehicle 10 edge. When the vehicle 10 crosses a threshold 26 defining a predetermined safe distance from a particular obstacle O, a warning signal is sent to the control mechanism of the vehicle 10 and the vehicle 10 changes its velocity vector $\vec{v}_v$ in order to avoid a collision with the obstacle O. The layer thicknesses may be variable in order to improve the safety mechanism of the vehicle 10; where more safety is required, a thicker layer may be utilized.

When the vehicle 10 reaches an edge of a calculated cuboid 14, the control mechanism adjusts the orientation and velocity $\vec{v}_v$ of the vehicle 10. The walls 16 of the cuboid 14 contain depth information, and thus, when the vehicle 10 is moving, the cuboid 14 is recalculated and a comparison of the positions of the obstacles O within the scene are made again.

The vehicle 10 may use a path finder algorithm to avoid a collision with an obstacle O, which is explained in more detail below. FIGS. 3 and 4 illustrate the avoidance of an obstacle O in which the velocity vector of the vehicle N (= $\vec{v}_v$) is shown. In order to avoid a collision, the vehicle 10 must stay inside the cuboid 14 in such a way that a difference between the area of the cuboid 14 and the area of the vehicle 10 remains constant.

The mathematics behind these determinations is as follows. In case an obstacle O moves towards the vehicle 10 or vice versa, a new velocity vector (N or $\vec{v}_v$) is calculated that should point in a direction perpendicular to the direction of an approach vector $\vec{v}_{vo}$ of the vehicle 10 to the obstacle O (or the approach vector of the obstacle towards the vehicle).

Figure 9:
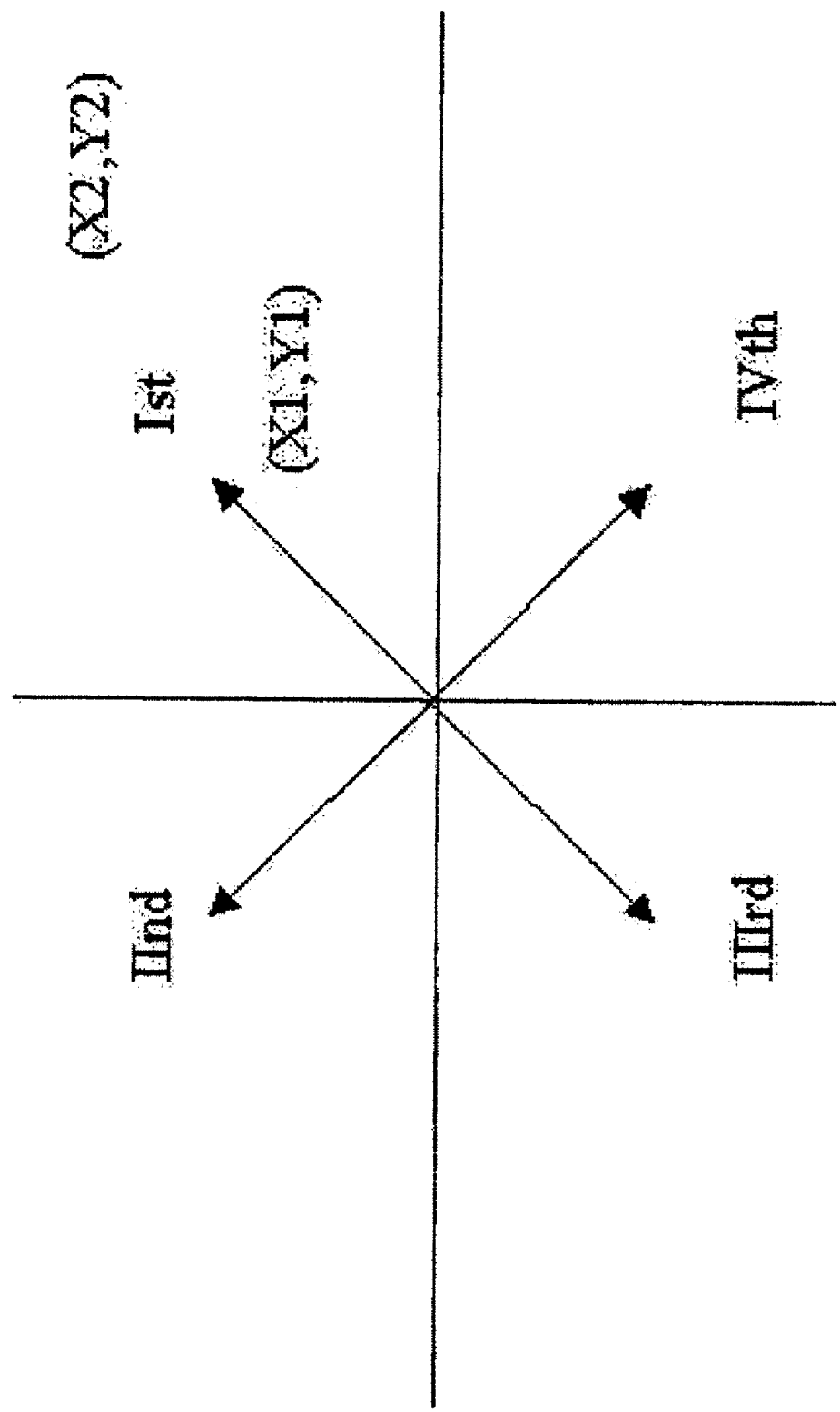
FIG. 9 is a spatial diagram illustrating directions for movement of an object.

The mechanics for determining the approach vector can be explained as follows. Referring to FIG. 9, (X1,Y1) and (X2,Y2) are two arbitrary points on the trajectory of the moving object, and the origin is at the position of the camera 12. In quadrants I and IV, the trajectory of the vehicle 10 is perpendicular to the direction of the motion of the moving object; in quadrants II and III, the trajectory of the vehicle is parallel to the direction of the motion of the moving object O.

Figure 10:
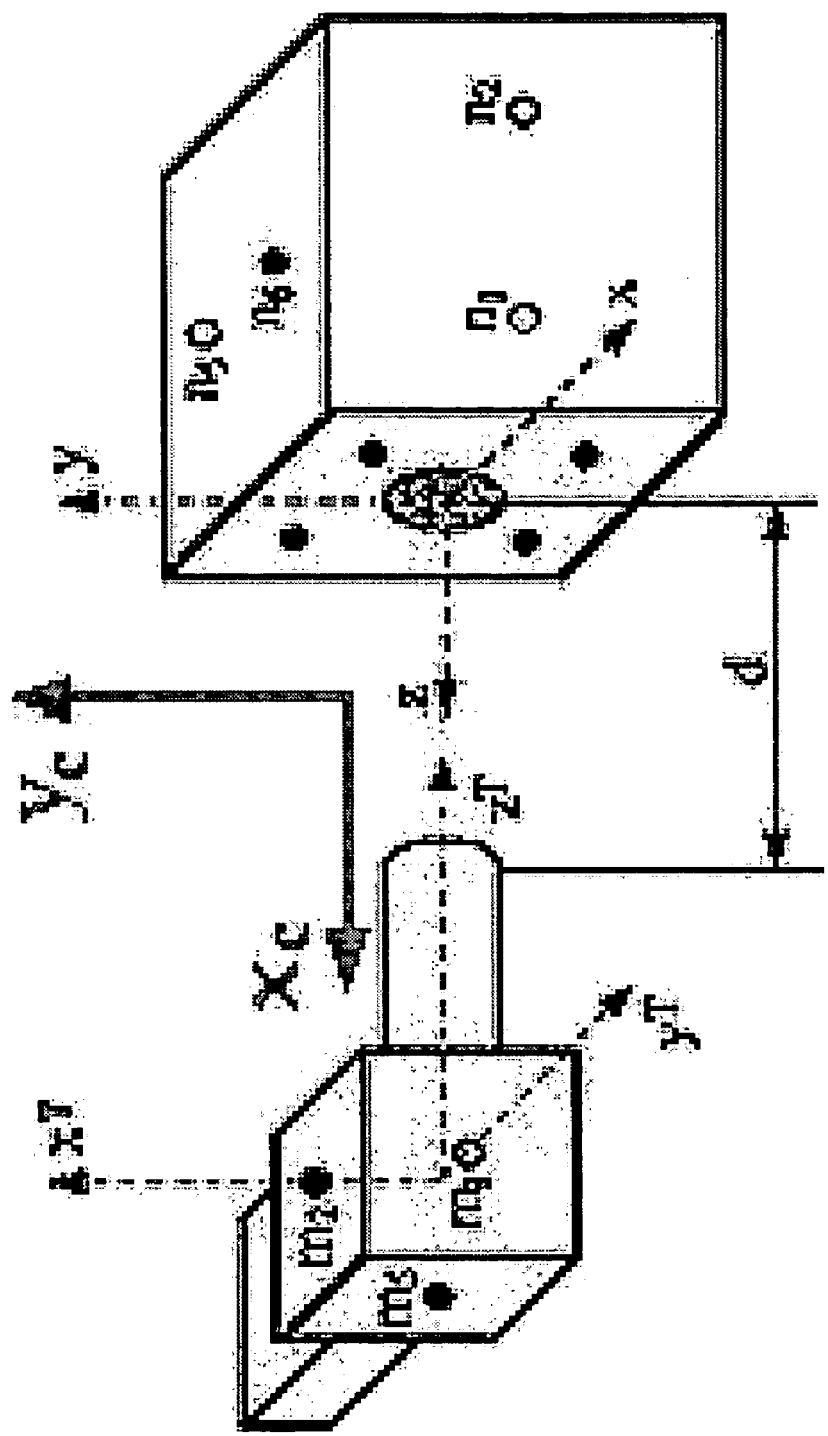
FIG. 10 is a spatial diagram for illustrating the mapping of three-dimensional physical space into a two-dimensional image plane.

Vehicle positioning at an initial point of movement of the object O could be calculated by making use of a linear predictor. The three dimensional physical space to two dimensional image plane is approximately a perspective projection of three dimensional space onto the image plane. It could be referred to a camera fixed physical reference frame XYZ onto the image plane with coordinate system (xc, yc) as follows, referring to FIG. 10.

$$x_c = f\frac{X}{Z}$$

$$y_c = f\frac{Y}{Z}$$

where f is the effective focal length of the camera and X and Y are parallel to $x_c$ and $y_c$ respectively. The Z-axis is in the direction of the camera focal axis.

Figure 8:
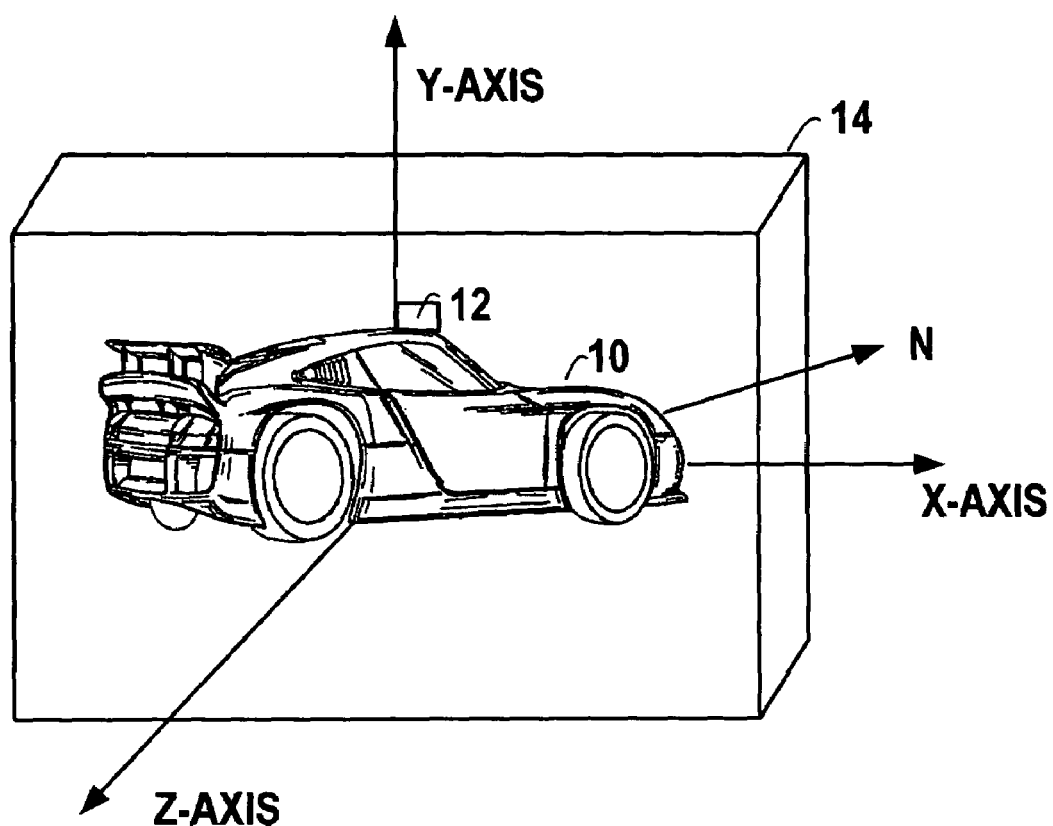
FIG. 8 is a pictorial illustration of the vehicle and cuboidal coordinate reference frame with the vehicle velocity vector.
Figure 11:
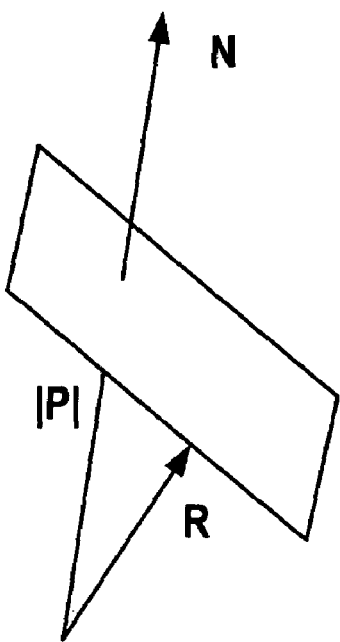
FIG. 11 is a pictorial illustration of planes/faces for the cuboidal structure.

The two dimensional realization of collision points can lead to the three-dimensional realization of a collision plain, making the problem more general. FIGS. 8 and 11 illustrate the spatial arrangement for the collision plane, where:
N=normal vector to the plane;
R=a vector to a point on the plane from the origin (camera position); and
|P|=a perpendicular drawn on the plane from the origin.

In order to determine the approach vector, first the equation of the plane N is calculated, and then the vector normal to the plane |P| is calculated:

$A1x+A2y+A3z=C;$ where A=[A1 A2 A3]; and $A*R=C.$

The unit vector in the direction of A is:

$N=A/|A|.$

The unit vector perpendicular R to the plane can follow the orientation or the vector N, i.e., the vector that is also known as Hesse's normal form by Ludwig Otto Hesse:

$N*R=P;$ and $P=C/|A|.$

This projection has same constant value C/|A| for the position vector R of any point in the plane. Clearly this provides the vector N perpendicular to the plane.

Figure 12:
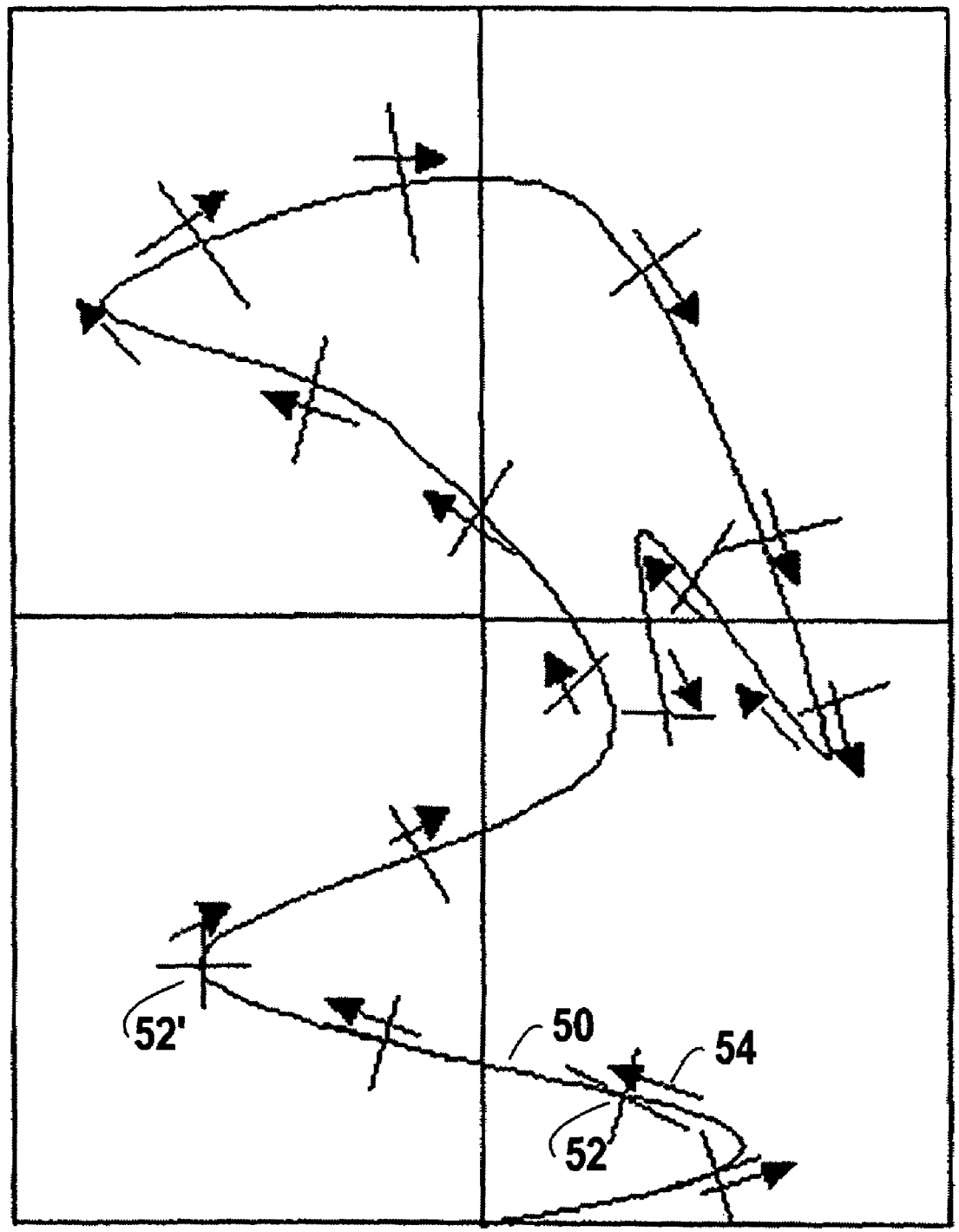
FIG. 12 is a two-dimensional overhead view showing a motion path of the vehicle with changing reference frames.

FIG. 12 illustrates the changing reference frames as the vehicle moves along a path 50. The vehicle 10 keeps changing its reference frame 52, 52' with a change in the environment of the vehicle 10. This helps keep an accurate measurement of the relative motion for controlling the vehicle 10. The reference frame 52, 52' will follow the direction of the motion 54 of the vehicle 10, which helps to reduce computations in the algorithm.

The probability of hitting an obstacle by the vehicle 10 can be minimized by manipulating the origin of the reference frame 52, 52' at every curve inflection point as depicted in FIG. 12. The arrow 54 indicates the direction of the motion of the vehicle 10, and the approach vector follows the rules defined above. Linear probabilistic theory and kinematical equations of motion are used for the trajectory of the vehicle and cuboid. The algorithm shifts the origin of the reference frame 52, 52' at every rotation of the camera 12 as a new depth map is obtained containing the information about the obstacle O. The rules mentioned for the approach vector are applied here too at some defined interval in order to avoid the collision of the vehicle 10 with the obstacle O.

The probability of avoiding an obstacle O by the vehicle 10 can be improved by manipulating the origin at every transient point as depicted in FIG. 12. The arrow → indicates the direction of the motion of the three-dimensional object. Linear probabilistic theory can minimize the error probability. The steps of the algorithm are as follows: 1) calculate the initial direction of motion of the three dimensional object; 2) calculate the equation of the trajectory; and 3) shift the origin at every critical (inflection) point, i.e., the point where the object changes it direction of motion. The vehicle motion and the approach vector follow the motion rules defined above according to the camera space manipulation.

Using the previously defined equations for the camera 12 reference frame for the camera space manipulation:

$$x_c = f\frac{X}{Z}$$

$$y_c = f\frac{Y}{Z}$$

The points specified in the camera fixed reference frame can be referred to a second physical reference frame xyz using the relation:

$$\begin{Bmatrix} X \\ Y \\ Z \end{Bmatrix} = [c]\begin{Bmatrix} x \\ y \\ z \end{Bmatrix} + \begin{Bmatrix} X_0 \\ Y_0 \\ Z_0 \end{Bmatrix}$$

where $$[c] = \begin{bmatrix} e_0^2+e_1^2-e_2^2-e_3^2 & 2(e_1e_2+e_0e_3) & 2(e_1e_3-e_0e_2) \\ 2(e_1e_2-e_0e_3) & e_0^2-e_1^2+e_2^2-e_3^2 & 2(e_2e_3+e_0e_1) \\ 2(e_1e_3+e_0e_2) & 2(e_2e_3-e_0e_1) & e_0^2-e_1^2-e_2^2+e_3^2 \end{bmatrix}$$

and $e_0^2+e_1^2+e_2^2+e_3^2=1$

The values $e_0$, $e_1$, $e_2$ and $e_3$ are the four Euler parameters that satisfy the above constraint, and ($X_0$, $Y_0$, $Z_0$) locates the origin of the coordinate system relative to the camera based coordinate system XYZ. The image coordinates could be further calculated as follows:

$$x_c = f\frac{X}{Z} = F_x(x, y, z; P) = \frac{N_x}{D+\frac{1}{\varepsilon}} = \Psi_x(\varepsilon)$$

$$y_c = f\frac{Y}{Z}F_y(x, y, z; P) = \frac{N_y}{D+\frac{1}{\varepsilon}} = \Psi_y(\varepsilon)$$

where $P=[e_0, \ldots ,e_3,X_0,Y_0,Z_0,f]^T$ $N_x=f[(e_0^2+e_1^2-e_2^2-e_3^2)x+2(e_1e_2+e_0e_3)y+2(e_1e_3-e_0e_2)z+X_0]$ $N_y=f[2(e_1e_2-e_0e_3)x+(e_0^2-e_1^2+e_2^2-e_3^2)y+2(e_2e_3+e_0e_1)z+Y_0]$ $D=[2(e_1e_3+e_0e_2)x+2(e_2e_3-e_0e_1)y+(e_0^2-e_1^2-e_2^2+e_3^2)z]$ $$\varepsilon = \frac{1}{Z_0}$$

By expanding $\Psi_x$ using a Taylor series about $\epsilon=0$, the following is obtained:

$$\Psi_x(\varepsilon) = \Psi_x|_{\varepsilon=0} + \frac{\delta^2\Psi_x}{\delta\varepsilon}\bigg|_{\varepsilon=0}\varepsilon + \frac{\delta^2\Psi_x}{\delta^2\varepsilon}\bigg|_{\varepsilon=0}\frac{\varepsilon^2}{2} + \dots$$

$$= N_x\varepsilon - N_xD\varepsilon^2 + \dots$$

The same approach could be used for $Y_c$. If only a first order approximation is considered, then $f/Z_0$ can be combined with the rest of the parameters to form a new parameter vector:

$$\overline{C}=[\overline{C}_1,\overline{C}_2,\overline{C}_3,\overline{C}_4,\overline{C}_5,\overline{C}_6]^T.$$

The resulting approximation of the model is given by:

$$x_c = (\overline{C}_1^2 + \overline{C}_2^2 - \overline{C}_3^2 - \overline{C}_4^2)x + 2(\overline{C}_2\overline{C}_3\overline{C}_4)y + 2(\overline{C}_2\overline{C}_4 - \overline{C}_1\overline{C}_3)z + \overline{C}_5$$
$$\equiv f_x(x, y, z; \overline{C})$$

$$y_c = 2(\overline{C}_2\overline{C}_3 - \overline{C}_1\overline{C}_4)x + 2(\overline{C}_1^2 - \overline{C}_2^2 + \overline{C}_3^2 - \overline{C}_4^2)y + 2(\overline{C}_3\overline{C}_4 + \overline{C}_1\overline{C}_2)z + \overline{C}_6$$
$$\equiv f_y(x, y, z; \overline{C})$$

The following pseudo-code listings illustrates an embodiment of the inventive method.

Figure 13:
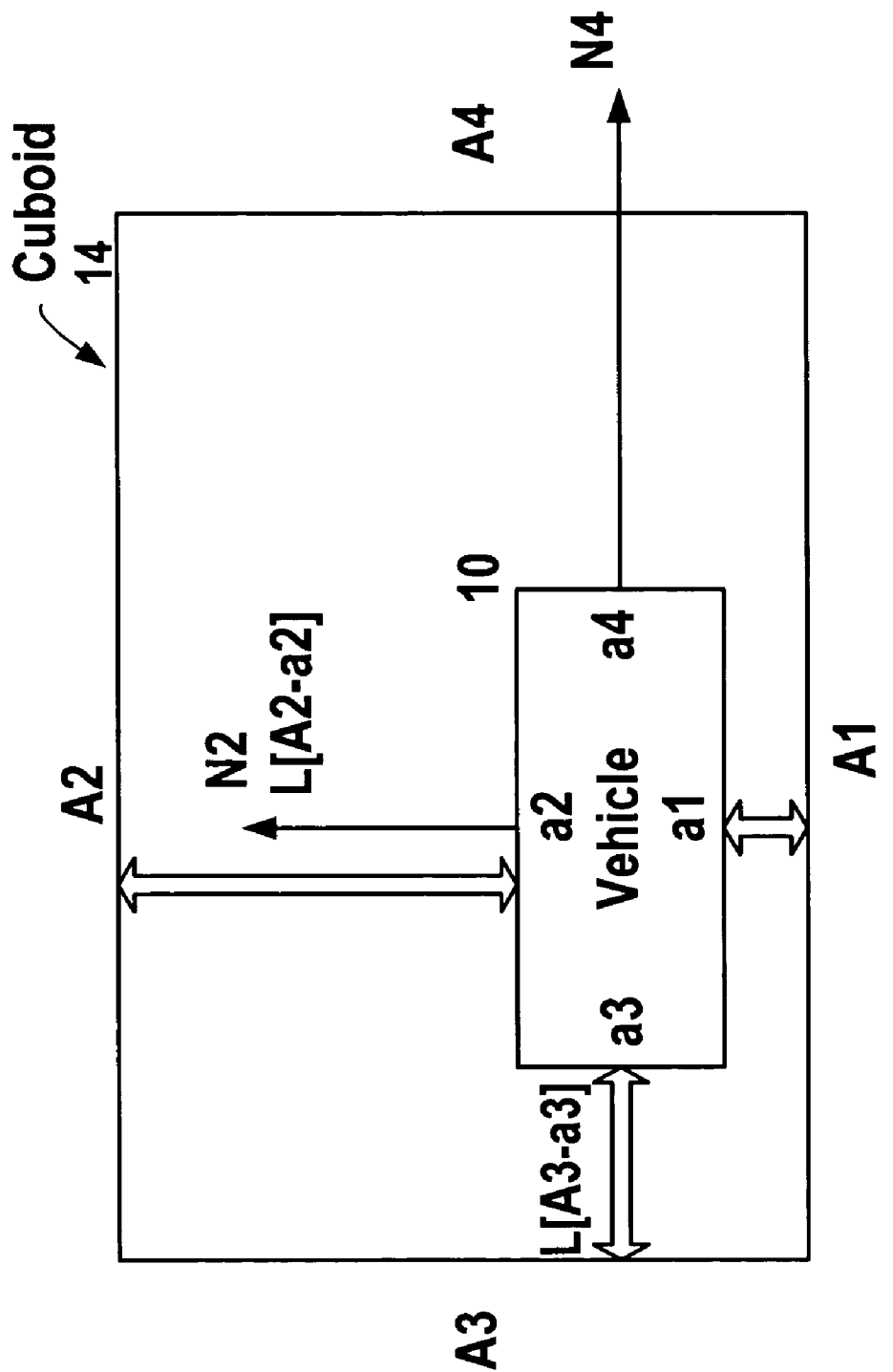
FIG. 13 is a two-dimensional view illustrating the vehicle position and motion within a cuboid.

```
//* The rotational velocity of the camera depends upon the velocity of the vehicle and
relative velocity of the obstacles-determine the rotational velocity of the camera *//
If the vehicle is moving relative to the objects (or vice versa), then
    Adjust the rotational velocity of the camera using a look up table;
//* Generation of the cuboid *//
    If one rotation of the camera is complete, then
        Calculate the 360-degree panoramic image and divide it into four parts
        keeping the camera as the origin. Create the image in such a way that it
        makes a virtual cuboid around the vehicle;
//* Generation of layers within the cuboid *//
//* The walls of the cuboid contain depth information from the state of the art
techniques *//
        while the vehicle continues to move
        {
        Calculate the cuboid again and compare the positions of the obstacles within
        the scene producing a two-dimensional depth map after every rotation of the
        camera;
        Define virtual cuboidal structures within the cuboid;
            //* Path finding algorithm*//
        If the distance between the vehicle and the obstacle crosses a threshold
        assigned to avoid a collision with the obstacle (as defined by the nearest
        surface, then
            Move the vehicle in a way to avoid the collision based on the
            calculations;
            //* Referring to FIG. 13 *//
        If the wall A1 of the cuboid is coming near an edge a1 of the vehicle, then
        {
            Check the calculated layer thickness L[A2-a2] on the other side (a2) of
            the vehicle and move the vehicle in the opposite direction (towards A2)
            If the wall facing A2 is also coming near to a2, then
                //* Approach vector of the vehicle *//
                increase the speed of the vehicle in the direction perpendicular of
                the normal vector N2;
                Figure : a1, a2, a3 and a4 are the four faces of the vehicle. A1, A2,
                A3 and A4 are the corresponding faces of the cuboid. N2 and N4 are
                the normal vectors to the faces a2 and a4 respectively.
        } end of if the wall A1 of the cuboid is coming near an edge a1 of the vehicle
        //* In case there are several obstacles, then a mean value is calculated.*//
        if more than one obstacle is present, then
            calculate a mean positional value for the obstacles;
//* Camera space manipulation *//
        If the environment is changing with respect to time utilizing the depth map, then
            Check the cuboid position after every rotation and assign a new position of
            the vehicle as the origin and perform all calculations with respect to the new
            origin;
            //* Note that all the obstacle positions are relative to the vehicle; the new
            reference coordinate system will follow the velocity vector *//
```

-continued

```
//* Controlled feedback and adaptive learning of user and environment *//
        If the obstacle velocity is constant with respect to the cuboid, then
                Use fixed cuboid structure
        Else
                Assign a variable layered cuboid structure;
//* The cubical walls change which means the relative motion between the obstacles
and the vehicle, the sensory mechanism informs the control mechanism about the
probability of collision *//
        } end while vehicle continues to move
```

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for monitoring movement of a moving object, comprising:
   a) constructing a panoramic image from images of a rotating camera attached to the moving object;
   b) constructing a virtual cuboid around the moving object utilizing data from the panoramic image;
   c) calculating a difference between a position of the cuboid and a position of an obstacle; and
   d) changing a moving direction of the moving object if the difference between the position of the cuboid and the position of an obstacle is smaller than a threshold value to avoid the obstacle.

2. The method according to claim 1, further comprising repeating the method steps a) to d) after predetermined time intervals.

3. The method according to claim 1, further comprising repeating the method steps a) to d) after a 360-degree-rotation of the camera.

4. The method according to claim 1, wherein changing the moving direction of the moving object comprises changing the moving direction to avoid a collision with the obstacle.

5. The method according to claim 1, wherein the moving object is a vehicle.

6. The method according to claim 1, wherein the moving object is a tool for a medical intervention.

7. The method according to claim 1, wherein the moving object is a part of a robot.

8. The method according to claim 1, wherein the moving object is a synthetic object that is inserted into a natural environment.

9. The method according to claim 1, wherein the moving object is an object in a computerized 2-D or 3-D game.

10. The method according to claim 1, further comprising:
    producing control signals to a control mechanism of the moving object in order to change the moving direction or moving speed of the moving object.

11. The method according to claim 10, wherein the control mechanism is at least one of a steering mechanism, an acceleration mechanism, and a deceleration mechanism.

12. The method according to claim 1, further comprising:
    calculating a mean position of multiple obstacles, and utilizing the mean position of multiple obstacles for the position calculations.

13. The method according to claim 1, further comprising:
    manipulating on origin of a reference frame of the moving object at each inflection point in a path of the moving object.

14. The method according to claim 1, further comprising:
    determining a probability of collision between the moving object and the obstacle; and
    providing the probability of collision to a control mechanism of the moving object.

15. The method according to claim 1, further comprising:
    generating a layer within the cuboid corresponding to a depth from a particular vehicle edge that is utilized to send a warning signal to a control mechanism of the vehicle.

* * * * *